3,236,829
DISAZO GAMMA-RESORCYLIC ACID DYE COMPOSITIONS
Ernest M. May, Summit, and Andrew Fono, Montclair, N.J., assignors to Otto B. May, Inc., Newark, N.J., a corporation of New Jersey
No Drawing. Filed Jan. 14, 1963, Ser. No. 251,040
16 Claims. (Cl. 260—187)

This is a continuation-in-part of an application, Serial No. 204,642, filed on June 22, 1962, and now abandoned.

This invention relates to new dyes; and, more particularly, it is concerned with compounds which are especially suitable for dyeing shaped articles of polypropylene and other thermoplastic resins, such as polyesters, polyacrylics, polyamides and other polyolefins.

In the past, many classes of dyes have been applied to shaped articles, such as synthetic fibers, in an attempt to dye these articles in a commercially satisfactory way, that is to say, to yield a brilliant dyed product which is fast to light, washing and dry cleaning. However, these classes of dyes have not been entirely suitable since the articles dyed therefrom have had a relative poor fastness to light, washing or dry cleaning, or they have had inadequate brilliance.

An object of the present invention is to obtain dye compositions which are suitable for dyeing polypropylene and other polyolefins to provide an end product with superior fastness properties and with excellent brilliance and tinctorial value.

Another object of the invention is to obtain dyes which can be used for dyeing other thermoplastic resins, such as polyesters, polyacrylics, and polyamides to form a dyed article having excellent fastness to light, washing and dry cleaning and having exceptional brilliance.

It is common practice in the textile industry to form composite fabrics containing two or more types of fibers. For example, the composite fabric may be woven of threads containing, in a predetermined pattern, threads of polypropylene, nylon, and/or other fibers, such as polyacrylics, natural fibers, etc. With respect to these composite fabrics, there is an immediate problem of finding a dye which will give a "union" dyeing. This is a problem and a term which is well-known in the art.

Accordingly, another object of this invention is to produce dyes which will dye simultaneously and satisfactorily mixed fabrics composed of more than one synthetic and/or wool and silk fibers.

A further object of the present invention is to provide dyes which are fast to washing and severe dry cleaning when applied to shaped articles, particularly fibers containing finely dispersed metallic compounds; more specifically to provide dyes of extraordinary brilliance and tinctorial value.

One of the very difficult problems that has confronted the industry is stabilizing polypropylene and other polyolefin fibers against aging, that is, degradation caused by exposure to air, light, and/or heat. Many types of known stabilizers have been incorporated into the fibers to impart some degree of stability thereto. However, these stabilizers generally are removed by washing and/or dry cleaning with various solvents, and the fibers lose most or all of their resistance to aging.

Accordingly, still another object of this invention, is to stabilize shaped articles formed from polypropylene and other polyolefins and preferably simultaneously stabilize and pigment such materials.

Another object is to improve stability and the resistance of these polymers to aging, particularly after they have been washed, dry cleaned or exposed to other solvents.

Other objects and advantages of the present invention will appear from the following description.

According to the present invention, it has been found that certain disazo gamma-resorcylic acid compounds confer exceptional brilliance and excellent washing and dry cleaning stability when they are dyed on thermoplastic shaped articles of polyolefins, particularly polypropylene containing a metal; polyamides; and polyacrylics. These disazo gamma-resorcylic acid compounds are described by the following structural formula:

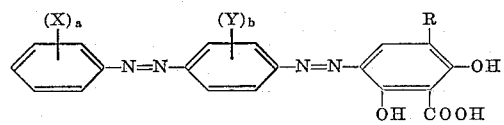

wherein each X is a substituent group attached to the benzene nucleus independently selected from the group consisting of $C_1$ to $C_{20}$ alkyl, cycloalkyl having up to 6 carbon atoms, nitro, halogen, acyl having up to 6 carbon atoms, benzoyl, N-alkylsulfonamido, said alkyl containing 1–5 carbon atoms, N,N-dialkylsulfonamido each of said alkyls containing 1–5 carbon atoms, alkoxy containing 1–4 carbon atoms, trifluoromethyl, cyano, benzoylamino, carboxyl, carboalkoxy containing 1–4 carbon atoms, dialkylamino each of said alkyls containing 1–5 carbon atoms, beta-cyanoethyloxy, beta-hydroxyethyloxy, alkylsulfonyl containing 1–4 carbon atoms, hydroxyalkylsulfonyl containing 1–4 carbon atoms, di-(beta-hydroxyethyl)-amino, di-(beta-cyanoethyl)-amino, 2,3-benz- and aryl; wherein each Y is a substituent group attached to the benzene nucleus independently selected from the group consisting of $C_1$ to $C_{20}$ alkyl, 2,3-benz, cycloalkyl having up to 6 carbon atoms, an alkoxy containing 1–4 carbon atoms, beta-hydroxyethyloxy, beta-cyanoethyloxy, halogen and trifluoromethyl; R is a substituent group attached to the benzene nucleus selected from the group consisting of hydrogen and a halogen; $a$ is an integer from 0 to 5 inclusive; and $b$ is an integer from 0 to 4 inclusive. However, other chromophoric substituents for X and Y on the benzene nuclei may also be applicable, e.g., hydroxy, halo alkyl, alkoxy alkyl, cyano alkyl and aryl alkyl.

The foregoing groups may be substituted with simple substituents recognized in the dyeing art such as methyl, nitro, halogen, methoxy and other lower alkoxy groups (containing 1 to 5 carbon atoms) trifluoromethyl carbonamido, etc.

Preferred disazo gamma-resorcylic acid compounds are found among those in which the group or groups X or Y include at least one lower alkyl, that is 1 to 4 carbon atoms such as methyl; or compounds in which the group or groups X or Y include at least one trifluoromethyl group, or at least one halogen (fluorine, chlorine, or bromine), or at least one lower alkoxy group (1 to 4 carbon atoms); or compounds in which the group or groups X include at least one nitro group; or compounds in which the group or groups X or Y include the 2,3-benz group.

The desirable properties of the compounds described above are realized by reacting them with a metallic compound of aluminum or zinc. The reaction product is generally formed in the shaped articles, such as fibers of polypropylene and other polyolefins, by incorporating initially a metal compound of aluminum or zinc into the polyolefin. This procedure will be described more completely hereafter.

The precise nature and structure of the aforementioned reaction product is not clearly understood. However, it is thought that a chelate ring or linkage may be formed between the metallic cation and the adjacent carboxylic and hydroxyl groups on the gamma-resorcylic acid ring, and this may be responsible for the desirable properties of the formed reaction product. Furthermore, there is no precise stoichiometric ratio between the dye and the metallic compound. This is believed to be due to any one or more of a number of factors. In the first place, the metallic compound may not penetrate into all of the interstices of the dye or vice versa; and, therefore, the reaction may not be complete. In the second place, aluminum and zinc are known to exist in the form of polymers or oligimers; and, therefore, a single dye molecule may account for more than one atom of the metal. The amount of dye used may be sufficient to account for all of the metal present; however, this is not an absolute requirement. For instance, in dyeing shaped articles, such as fibers, it may not be necessary to provide enough dye to react with all of the metal which is finely divided and uniformly distributed throughout the mass. Furthermore, the ratio of fiber to metal is not a critical feature of the invention and a suitable ratio may be readily determined from a given set of circumstances and the desired objectives.

A particularly striking feature of this invention is the stabilizing effect of the disazo gamma-resorcyclic acid compounds on the polypropylene or other polyolefin shaped article, such as a fiber. As stated heretofore, stabilizing such materials has been a very difficult problem, particularly since laundering, dry cleaning or exposure to other solvents tend to remove known stabilizers. It has been surprisingly found in accordance with the present invention that the disazo gamma-resorcyclic acid compounds described above impart stability to the polypropylene or other polyolefin and resist removal by laundering, dry cleaning, etc.

The aforementioned disazo dyes can be prepared by various methods. However, they are generally formed by coupling an aminoazo benzene through diazotization with gamma-resorcylic acid. The aminoazo benzenes can be provided by rearrangement of a diazoamino compound; by coupling a diazonium compound with an aniline derivative; or by coupling the diazonium compound with an N methane sulfonic acid salt of an aniline derivative and subsequently hydrolyzing the resulting product with aqueous alkali.

In one embodiment, a shaped article, for example, a synthetic fiber, has a metal incorporated therein before a disazo gamma-resorcyclic acid compound is applied. The synthetic fibers or other shaped article applicable to this invention include polyolefins, polyesters, for example, condensation products of polybasic acids with polyhydric alcohols and Dacron; polyamides, such as nylon; polymers of acrylic acid compounds, such as acrylonitrile; and polymers of vinyl compounds, such as vinyl alcohol, vinyl chloride and styrene. A polyolefin, which is the preferred polymer for a synthetic fiber, includes the following polymers among others: polyethylene, polypropylene, polybutene, poly-3-methyl-butene-1, polypentene, poly-4-methyl-pentene-1, and polyheptene. The polyolefin, e.g., polypropylene, can be prepared by any known method. A suitable, but not the only method, is disclosed in Belgian Patent No. 533,362, which is incorporated herein by reference.

Synthetic shaped articles are formed from the aforementioned thermoplastic polymers in accordance with known prior art procedures. A fiber, which is preferred, is defined herein as any fibrous unit, e.g., filament yarns, rovings, mats, staple yarns, sheets, rods, plates, woven fabrics and chopped fibers. The following exemplify specific commercial fibers which can be employed herein: Spun Dacron T-54, nylon filament thread, Cresland T58, Acrilan 1656, and Polypropylene 805 Fiber.

Although synthetic fibers are usually employed, the metallic reaction product embodiment is also applicable to natural fibers, e.g., wool, animalized cotton and silk. Furthermore, it is also possible to use a combination of any two or more synthetic or natural fibers to form a composite fabric. Union dyeing is provided on the composite fabric by using the disazo dyes described herein.

The metal, which is incorporated into the fiber, forms a reaction product with the subsequently applied dye composition. Aluminum and zinc are the preferred metals, and they are utilized as metallic compounds. Organic metal salts, which are preferred, may be employed within the range of .02 to .2% based upon the weight of the fiber. Carboxylic acid metal salts with 6 to 20 carbon atoms, which are suitable for this invention, include aluminum stearate, zinc stearate, aluminum laurate, and the aluminum salt of 2-ethyl hexanoic acid. These salts are intimately dispersed throughout the polymer at any stage prior to its extrusion. An efficient blending apparatus is usually adequate to accomplish this result. After dispersion the blend may be extruded at the fluid temperature for the polymer, i.e., 250 to 350° C. for polypropylene. Accordingly, the metal is usually distributed uniformly throughout the fiber, e.g., polyolefin fiber, which provides complete penetration of the dye from the dye bath into the fibers. By way of illustration, the incorporation of the metal salt in the polymer may be made by mixing 10 parts of the powder of the salt with 90 parts of the powder of the polymer to an intimate and uniformly dispersed mixture. This mixture may be extruded to form a concentrate which subsequently is finely divided again and intimately blended with additional polymer to obtain the desired low concentration of metal for extrusion to the shaped product.

The disazo gamma-resorcyclic acid compounds heretofore described form the basis of an aqueous dye bath into which the fibers are immersed. Since the dyes are insoluble in water, they are dispersed or emulsified in the bath. The concentration of the dye bath can vary over a wide range, depending upon the depth of shade desired. Any known dyeing technique can be employed in this invention. For example, a skein can be simply immersed into the bath at its approximate boiling temperature; or a finished piece can be dyed by using a jigger. The dye bath can be slightly acidic and the fiber is usually rinsed and dried subsequent to its immersion in the dye bath. Known pressure dyeing techniques which accelerate the entry of the dye into the fiber may also be used.

In another embodiment of the present invention, the fiber, i.e., a synthetic or natural fiber, is not modified with a metallic material. This unmodified fiber is immersed directly into a dye bath and subsequently rinsed and dried. These steps can be accomplished by any procedure known in the art and can be similar to the procedures described for the above embodiment. For example, the aqueous dye bath suspension can contain a sulfonated oil, soap, sodium lignin sulfonate, or other suitable dispersing agent. Although direct dyeing operations are generally performed at temperatures of about 160° to 212° F., any suitable temperature can be used, including pressure dyeing and thermofixation techniques. The fiber to be dyed is usually added to the dye bath initially at a relatively low temperature and then a higher temperature is provided for carrying out the actual dyeing operation. The intensity of dyeing is varied by changing the proportion of the weight of dye to the weight of the fiber.

Thus, in accordance with the instant invention, disazo gamma-resorcylic acid compounds have been provided which are suitable dyestuffs. Furthermore, these compounds will react with metal-modified shaped articles to form a dyed end product which has excellent brilliance and tinctorial value and which is also fast to light, dry cleaning and washing. Similarly, these compounds can be applied directly to dye an unmodified fiber since, for example, nylon, polyester, and acrylic fibers have polar groups which can form a polar linkage with the present dyes to improve the receptivity of the dye and the fastness properties, such as light fastness of the dye on the fibers.

The following examples are submitted to illustrate but not to limit this invention. Unless otherwise indicated, all parts and percentages in the specification are based upon weight.

Example I

A 4-nitrobenzeneazo-2,5-dimethoxybenzeneazo-gamma-resorcylic acid dyestuff was provided by dissolving 15.4 parts (.1 mol) of (pure basis) gamma-resorcylic acid in 500 parts of water containing 41 parts of sodium acetate. This first solution was cooled to 10–14° C.

A separate second solution was prepared from 87 parts of commercial Black K Salt, a stabilized diazo salt prepared from 4-(p-nitrophenylazo)-2,5-dimethoxyaniline and 1000 parts of water. Over a period of two hours, the second solution was added to the first solution at a pH of between 5.9 and 4.9. After an additional reaction time of two hours, the reaction product therefrom was filtered. The resulting filtrate was subsequently re-slurried in 1000 parts boiling water and 30 parts of concentrated hydrochloric acid for one hour. After cooling, filtering and washing neutral, the dyestuff was dispersed to a 10% aqueous paste.

Fiber grade polypropylene, which was blended intimately and uniformly with 0.080 wt. percent of aluminum monostearate, was used to manufacture 4½ denier crimped staple fiber by melt extruding, stretching, crimping and cutting to a 2 in. length. This cut fiber was subsequently carded and spun to produce yarns approximating .10's single (cotton system) count. Convenient sized skeins were then reeled from this yarn.

A sample containing ten grams of skein was provided. This sample was immersed in a 500 cc. dye bath at 120° F. The bath consists of an aqueous dispersion of 0.6 gram of the dry aforementioned dyestuff. Prior to the entry of the yarn, sufficient acetic acid was added to the dye bath to provide a pH of 6.0. The dyeing was accomplished by gradually raising the temperature of the dye bath to its boiling point during a 30 minute period. The skein was frequently turned with a glass stirring rod and the temperature was maintained at 212° F. for a period of one hour. The yarn was then removed from the dye bath and thoroughly rinsed in running water at 160° F. The skein was subsequently scoured by turning it for 30 minutes at 160° F. in a 400 cc. aqueous bath containing ½% of Triton X-100 (iso-octyl-phenyl poly ethoxy ethanol) and ½% of sodium carbonate. A thorough rinse was subsequently performed in running water at 110° F.

The dyed sample was then subjected to the following tests.

(1) *Color fastness to dry cleaning.*—Tentative Test Method 85–1960 (1960 Technical Manual of the American Association of Textile Chemists and Colorists, pages 88–9) amended as follows: the temperature shall be 115° F.; the time shall be 1 hour; and the amount of perchlorethylene shall be 200 cc.

(2) *Color fastness to washing (polypropylene).*—Tentative Test Method 61–1960, test number III–A (1960 Technical Manual of the American Association of Textile Chemists and Colorists, pages 93–4). In each instance, the dyeings shall rate (for polypropylene) as follows: for color loss, class 5; for staining, class 3 or better.

(3) *Color fastness for washing (synthetics).*—AATCC tentative test method 61–1961 T (page 105 loc. cit.) with Test III–A being used for polyester and after-chromed nylon and Test II–A for nylon.

(4) *Color fastness to light.*—AATCC Standard Test Method 16–A—1960 (page 90 loc. cit.).

(5) *Color fastness to oxides of nitrogen in the atmosphere (gas fading).*—Three cycles were used of Standard Test Method 23–1957 (page 98 loc. cit.) or Standard Test Method 75–1956 (page 100 loc. cit.).

(6) *Sublimation and heat fastness tests.*—Sublimation and heat fastness tests were run at 265° F. for 15 minutes.

The dyed polypropylene herein had a red-violet hue and possessed excellent fastness properties to washing, dry cleaning, gas fading, sublimation and light.

Example II

A benzeneazobenzeneazo-gamma-resorcylic acid dyestuff was formed by dissolving at 75° C. 23.3 parts (.1 mol) aminoazobenzene hydrochloride (pure basis) in 380 parts of water containing 19 parts (.17 mol) concentrated hydrochloric acid. After this solution was stirred all night and then cooled to 10° C., it was combined over a 2 hour period at a temperature below 10° C. with a solution of 7.0 parts (.12 mol) of sodium nitrate dissolved in 140 parts of water. The resulting diazo first solution was subsequently clarified by filtration.

A second solution was separately prepared from 15.4 parts (.1 mol) gamma-resorcyclic acid (pure basis) and 220 parts of water containing 42 parts of sodium acetate. The aforementioned first solution was added to this second solution at 10–14° C. over a 2 hour period maintaining the pH between 4.6 and 5.1. After an additional 2 hour reaction time, the resultant dyestuff was filtered and washed free of salts.

Polypropylene, which was dyed with this dyestuff in accordance with a comparable process described in Example I, had a brilliant red-orange shade with outstanding fastness properties.

Example III

The dye compounds indicated in Table I are dyes which were prepared by similar procedures with the reactants being varied to form the desired end product. Polypropylene was dyed with each compound as per Example I and the resultant shades are also indicated in Table 1.

TABLE I

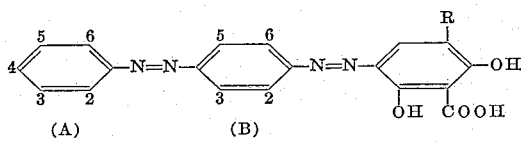

We claim:
1. A dye composition having the structure:

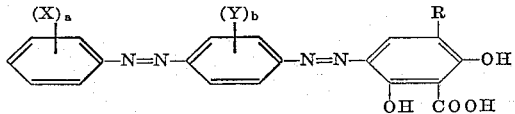

| Dye No. | A-Ring Substituents | B-Ring Substituents | R Substituents | Shade |
|---|---|---|---|---|
| 1 | | | H | Brilliant Red-Orange. |
| 2 | 3-CH₃ | | H | Do. |
| 3 | 3-CH₃ | 3-CH₃ | H | Do. |
| 4 | 2,4-di-CH₃ | 2-CH₃ | H | Do. |
| 5 | 2,4-di-CH₃ | 2,5-di-CH₃ | H | Red-Orange. |
| 6 | 4-NO₂ | | H | Orange. |
| 7 | 3-NO₂ | | H | Do. |
| 8 | 4-COOH | | H | Tan-Orange. |
| 9 | 2,3-Benz | | H | Yellow-Orange |
| 10 | | 2,3-Benz | H | Brilliant Maroon. |
| 11 | 4-NO₂ | 2,3-Benz | H | Red-Violet. |
| 12 | 2,5-di-Cl | | H | Brilliant Yellow-Orange. |
| 13 | 2-CH₃; 4-Cl | | H | Brilliant Gold. |
| 14 | 4-NO₂ | 2,5-di-CH₃O | H | Red-Violet. |
| 15 | 4-Br | | H | Brilliant Orange. |
| 16 | 4-NO₂ | 2,3-di-Cl | H | Brilliant Greenish-Gold. |
| 17 | 4-C₁₂H₂₅ | | H | Weak Gold. |
| 18 | 3-Cl | | H | Orange. |
| 19 | 2-NO₂; 4-CH₃ | 2-CH₃O; 5-CH₃ | H | Pink. |
| 20 | 4-CH₃CO | | H | Orange. |
| 21 | 2-CH₃O; 5-C₄H₉NHSO₂ | | H | Do. |
| 22 | 4-CH₃O | 2,3-Benz | H | Yellow-Orange. |
| 23 | 4-NO₂ | 2,5-di-C₂H₅O | H | Violet. |
| 24 | 4-CN; 2,5-di-CH₃O | 2,3-di-Cl | H | Pale Yellow. |
| 25 | 4-NO₂ | 2,3-di-Cl | Br | Brilliant Yellow. |
| 26 | 4-Cyclohexyl | 2,3-Benz | H | Pink. |
| 27 | | | Br | Orange. |

*Example IV*

Dye No. 5 in Table I was prepared by dissolving at 75° C. 76.5 parts (.3 mol) of pure 4-(2,4-xylylazo)-2,5-xylidine in 1000 parts of water containing 46 parts of concentrated hydrochloric acid. After cooling to 10–14° C., a solution of 21.2 parts (.31 mol) sodium nitrite and 200 parts water was added thereto over a period of one hour. The diazo first solution therefrom was filtered for clarification.

A separate second solution was formed from 46.2 parts (.3 mol) gamma-resorcyclic acid (pure basis) and 900 parts water containing 73.8 parts of sodium acetate. Over a period of two hours at 10° C., the clarified first solution was added to the second solution. The dyestuff therefrom was filtered and washed free of salts. The filter cake was finely dispersed to provide a 10% dyestuff paste.

A Dacron fiber was dyed by providing a bath at 180° F. containing 200 parts water and 1.5 parts of a blend of 67% biphenyl and 33% anionic emulsifier. Ten grams of skein were incorporated for a five to ten minute run. The aforementioned dye, which had been previously pasted and dispersed in 100 parts water, was added and the temperature of the bath was raised to boil for 1 to 1½ hours. The following procedures were subsequently employed: rinsing for 5 minutes in a fresh bath heated as rapidly as possible to 190 to 200° F.; dropping without cooling; and scouring at 200° F. for 15 to 20 minutes.

The dyed Dacron fiber was a brilliant red and it had excellent fastness to washing, dry cleaning and light.

Good fastness properties were also obtained by dyeing Dacron to an orange hue with Dye No. 6 (Table I) and a violet hue with Dye No. 14 (Table I).

Having set forth the general nature and specific embodiments of the present invention, the scope is now particularly pointed out in the appended claims.

wherein each X is a substituent group attached to the benzene nucleus independently selected from the group consisting of $C_1$ to $C_{12}$ alkyl, cycloalkyl having an amount up to 6 carbon atoms, nitro, chlorine, bromine, fluorine, acetyl, N-alkylsulfonamido said alkyl containing 1–5 carbon atoms, alkoxy containing 1–4 carbon atoms, cyano, carboxyl and 2,3-benz-; wherein each Y is a substituent group attached to the benzene nucleus independently selected from the group consisting of lower alkyl, 2,3-benz-, alkoxy containing 1–4 carbon atoms, chlorine, bromine and fluorine; R is a substituent group attached to the benzene nucleus selected from the group consisting of hydrogen and bromine; $a$ is an integer from 0 to 3 inclusive; and $b$ is an integer from 0 to 2 inclusive.

2. The dye composition according to claim 1 in which X is nitro, Y is methyl and R is bromine.

3. The dye composition according to claim 1 in which X is methoxy, Y is chlorine and R is hydrogen.

4. The dye composition according to claim 1 in which X is 2,3-benz-, Y is methyl and R is hydrogen.

5. The dye composition according to claim 1 in which X is bromine, Y is methoxy and R is hydrogen.

6. The dye composition according to claim 1 in which X is chlorine, Y is 2,3-benz- and R is hydrogen.

7. The dye composition according to claim 1 in which X is methyl, Y is chlorine and R is bromine.

8. A dye composition which is benzeneazobenzeneazo-5-bromo-gamma-resorcyclic acid.

9. A dye composition which is 4-acetylbenzeneazobenzeneazo-gamma-resorcyclic acid.

10. A dye composition which is 4-nitrobenzeneazo-2,5-dimethoxybenzeneazo-gamma-resorcyclic acid.

11. A dye composition which is benzeneazobenzeneazo-gamma-resorcyclic acid.

12. A dye composition which is 2,4-dimethylbenzeneazo-2,5-dimethylbenzeneazo-gamma-resorcyclic acid.

13. A dye composition which is 4-nitrobenzeneazo-benzeneazo-gamma-resorcyclic acid.

14. A dye composition which is 4-bromobenzeneazo-benzeneazo-gamma-resorcyclic acid.

15. A dye composition which is benzeneazonaphthaleneazo-gamma-resorcyclic acid.

16. A dye composition which is 4-nitrobenzeneazonaphthaleneazo-gamma-resorcyclic acid.

References Cited by the Examiner

UNITED STATES PATENTS

| | | | |
|---|---|---|---|
| 431,297 | 7/1890 | Walter | 260—207 |
| 1,264,604 | 4/1918 | Bohn | 260—148 |
| 1,557,265 | 10/1925 | Miller | 260—187 |
| 2,080,191 | 5/1937 | Straub et al. | 260—148 |
| 2,096,722 | 10/1937 | Andersen | 260—148 |
| 2,867,494 | 1/1959 | Streck | 8—42 |
| 2,893,814 | 7/1959 | Streck | 8—42 |
| 3,096,140 | 7/1963 | Gaetani | 260—190 X |

FOREIGN PATENTS 551,437  2/1943  Great Britain.

CHARLES B. PARKER, *Primary Examiner.*

ABRAHAM H. WINKELSTEIN, *Examiner.*